US012725974B2

(12) United States Patent
Tasaka et al.

(10) Patent No.: US 12,725,974 B2
(45) Date of Patent: Sep. 1, 2026

(54) FITTING DETECTION METHOD, FITTING DETECTION DEVICE, AND FITTING DETECTION SYSTEM

(71) Applicant: Panasonic Intellectual Property Management Co., Ltd., Osaka (JP)

(72) Inventors: Kei Tasaka, Osaka (JP); Yuki Iwamoto, Osaka (JP); Suguru Nakao, Hyogo (JP); Hiroshi Kunimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 501 days.

(21) Appl. No.: 18/222,703

(22) Filed: Jul. 17, 2023

(65) Prior Publication Data

US 2023/0361511 A1 Nov. 9, 2023

Related U.S. Application Data

(63) Continuation of application No. PCT/JP2021/039306, filed on Oct. 25, 2021.

(30) Foreign Application Priority Data

Jan. 20, 2021 (JP) ................................ 2021-007276

(51) Int. Cl.
*H01R 13/641* (2006.01)
*G01H 1/00* (2006.01)
(Continued)

(52) U.S. Cl.
CPC ............. *H01R 13/641* (2013.01); *G01H 1/16* (2013.01); *G01H 17/00* (2013.01)

(58) Field of Classification Search
CPC .......... G01H 1/00; G01H 1/16; H01R 13/641; G06N 3/02; G06N 20/00
See application file for complete search history.

(56) References Cited

U.S. PATENT DOCUMENTS

2004/0143398 A1* 7/2004 Nelson .................... G01H 1/00 702/14
2009/0261973 A1* 10/2009 Eakle, Jr. .......... G07C 9/00309 340/540

(Continued)

FOREIGN PATENT DOCUMENTS

DE 10 2019 006 810 4/2020
JP 9-82443 3/1997
WO WO-2018094273 A1 * 5/2018 ............. G01M 7/00

OTHER PUBLICATIONS

International Search Report issued Dec. 21, 2021 in International Application PCT/JP2021/039306, with English translation.

(Continued)

*Primary Examiner* — Mark A Connolly
(74) *Attorney, Agent, or Firm* — Wenderoth, Lind & Ponack, L.L.P.

(57) ABSTRACT

A fitting detection method according to the present disclosure is a fitting detection method for detecting fitting which includes acquiring first data indicating information generated from vibration, acquiring second data output from a learned model by inputting the first data to the learned model having undergone machine learning using at least information generated from vibration generated by normal fitting as teacher data, determining whether or not the first data is related to fitting based on the second data, and determining whether or not normal fitting is performed based on the first data when the first data is related to fitting.

19 Claims, 14 Drawing Sheets

(51) Int. Cl.

| | |
|---|---|
| ***G01H 1/16*** | (2006.01) |
| ***G01H 17/00*** | (2006.01) |
| ***G06N 3/00*** | (2023.01) |

(56) References Cited

U.S. PATENT DOCUMENTS

| | | | | |
|---|---|---|---|---|
| 2018/0354088 | A1* | 12/2018 | Matsushita ............ | B23Q 15/12 |
| 2019/0101876 | A1 | 4/2019 | Ghangam et al. | |
| 2020/0063315 | A1 | 2/2020 | Yoon | |

OTHER PUBLICATIONS

Extended European Search Report issued May 3, 2024 in European Patent Application No. 21921168.7.

English translation of International Preliminary Report on Patentability issued Aug. 3, 2023 in International Application No. PCT/JP2021/039306.

* cited by examiner

START
ST10
ACQUIRE FIRST DATA
ST20
ACQUIRE SECOND DATA BY INPUTTING FIRST DATA TO LEARNED MODEL
ST30
No
CAN IT BE DETERMINED THAT FIRST DATA IS RELATED TO FITTING BASED ON SECOND DATA?
Yes
ST40
DETERMINE WHETHER NORMAL FITTING HAS BEEN PERFORMED BASED ON FIRST DATA
END

Fig. 7

<VIBRATION CAUSED BY NORMAL FITTING>

<VIBRATION CAUSED BY NORMAL FITTING>

FITTING DETECTION METHOD, FITTING DETECTION DEVICE, AND FITTING DETECTION SYSTEM

CROSS REFERENCE TO RELATED APPLICATION

This is a continuation application of International Application No. PCT/JP2021/039306, with an international filing date of Oct. 25, 2021, which claims priority of Japanese Patent Application No. 2021-007276 filed on Jan. 20, 2021, the content of which is incorporated herein by reference.

BACKGROUND

Technical Field

The present disclosure relates to a fitting detection method, a fitting detection device, and a fitting detection system.

Background Art

JP1997-082443 A discloses a connector fitting detection method. The fitting detection method described in JP1997-082443A detects that a connector including a lock mechanism is locked at a regular fitting position. In the method described in JP1997-082443A, the fitting operation of a connector is performed in a state where a vibration sensor is in contact with the connector, and fitting is detected on the basis of the detection of vibration during the operation of a lock mechanism by a vibration sensor.

SUMMARY

The present disclosure provides a fitting detection method, a fitting detection device, and a fitting detection system that can efficiently detect normal fitting.

A fitting detection method according to the present disclosure is a fitting detection method for detecting fitting which includes acquiring first data indicating information generated from vibration, acquiring second data output from a learned model by inputting the first data to the learned model having undergone machine learning using at least information generated from vibration generated by normal fitting as teacher data, determining whether or not the first data is related to fitting based on the second data, and determining whether or not normal fitting is performed based on the first data when the first data is related to fitting.

A fitting detection device according to the present disclosure is a fitting detection device for detecting fitting which includes a processor and a storage device configured to store an instruction executable by the processor. The instruction includes acquiring first data indicating information generated from vibration, acquiring second data output from a learned model by inputting the first data to the learned model having undergone machine learning using at least information generated from vibration generated by normal fitting as teacher data, determining whether or not the first data is related to fitting based on the second data; and determining whether or not normal fitting is performed based on the first data when the first data is related to fitting.

A fitting detection system according to the present disclosure is a fitting detection system for detecting fitting which includes a vibration sensor configured to detect vibration, a processor, and a storage device configured to store an instruction executable by the processor. The instruction includes acquiring first data indicating information generated from the vibration detected by the vibration sensor, acquiring second data output from a learned model by inputting the first data to the learned model having undergone machine learning using at least information generated from vibration generated by normal fitting as teacher data, determining whether or not the first data is related to fitting based on the second data; an determining whether or not normal fitting is performed based on the first data when the first data is related to fitting.

These general and specific aspects may be implemented by systems, methods, computer programs, computer-readable recording media, and combinations of them.

According to the fitting detection method, the fitting detection device, and the fitting detection system according to the present disclosure, normal fitting can be efficiently detected.

BRIEF DESCRIPTION OF DRAWINGS

FIG. 7 is a schematic diagram illustrating an example of the first data with an enlarged amplitude.

DETAILED DESCRIPTION

Knowledge Underlying Present Disclosure

As a fitting detection method for detecting normal fitting of a connector, for example, a method is known in which generated by fitting of the connector is detected by a vibration sensor, and whether or not the connector is normally fitted is determined based on the detected vibration.

However, the vibration sensor adopted in such a fitting detection method may detect vibration due to disturbance other than fitting of the connector. The vibration caused by disturbance is the vibration caused by other factors other than the fitting of the connector. For example, the vibration caused by disturbance includes the vibration caused by rubbing between the vibration sensor and clothes, the vibration caused by collision of the connector with a portion other than a fitting portion, and/or the vibration caused by collision between the connectors. In the fitting detection method, it is determined whether or not fitting is normal each time vibration is detected by the vibration sensor regardless of vibration due to fitting of the connector and vibration due to disturbance. The load of such determination processing is relatively high, and the determination time can be long. Furthermore, when it is determined whether or not the fitting is normal on the basis of the vibration due to the disturbance to be originally excluded, it is conceivable that it is determined that the fitting is accidentally performed, and the determination accuracy may decrease.

Therefore, the above-described fitting detection method has a problem that normal fitting cannot be efficiently detected. In addition, in a case in which a determination result as to whether or not the fitting is normal is displayed, a determination result is displayed every time the vibration sensor detects vibration due to disturbance, and hence, the convenience decreases.

In order to solve the above problem, the present inventors have found a configuration in which it is determined whether or not vibration is related to the fitting of the connector using the learned model, and then it is determined whether or not the fitting is normal. As a result, vibration due to disturbance can be excluded, and is possible to efficiently determine whether or not the fitting is normal.

FIRST EMBODIMENT

The first embodiment will be described below with reference to the accompanying drawings.

1. Fitting Detection System

The configuration of a fitting detection system 1 according to the first embodiment will be described with reference to FIG. 1.

Figure 1:
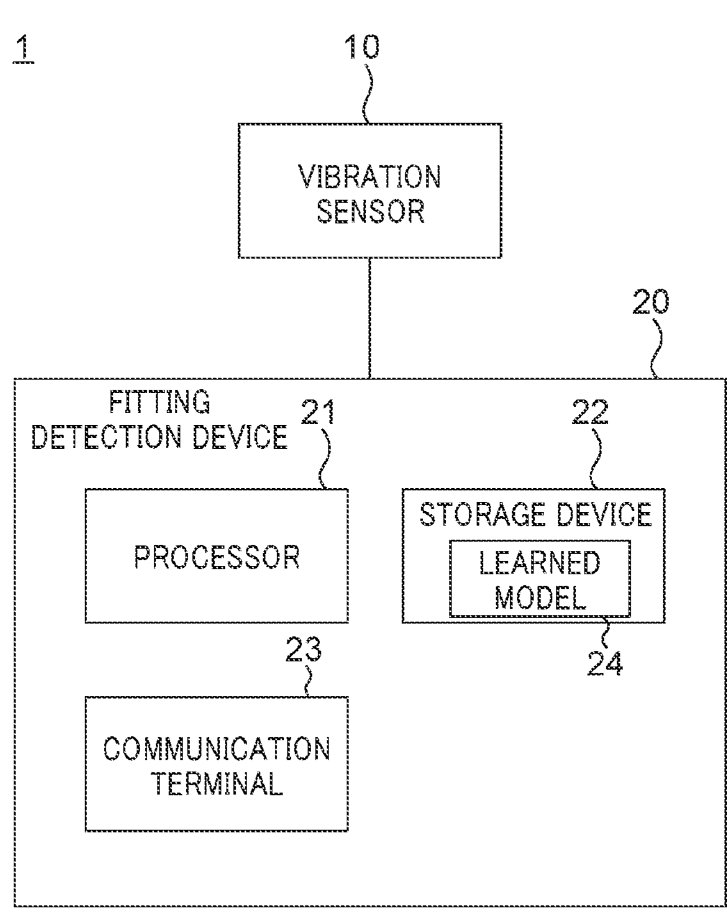
FIG. 1 is a schematic block diagram illustrating an example of a fitting detection system according to a first embodiment.

FIG. 1 is a schematic block diagram illustrating an example of the fitting detection system 1 according to the first embodiment. As illustrated in FIG. 1, the fitting detection system 1 includes a vibration sensor 10 and a fitting detection device 20.

The fitting detection system 1 is a system for detecting fitting. "Fitting" means that a pair of mechanical components are fixed at least in physical contact. In the present embodiment, the fitting of a connector will be described as an example of fitting. The "connector" includes a pair of mechanisms used to connect articles, and in a well-known example, a male connector and a female connector. For example, the connector is used to physically and/or electrically connect devices mounted on an automobile or the like. The "connector" may include a connection portion using a mechanism such as a latch. Specifically, the connector includes a wide variety of mechanical portions such as a door opening/closing mechanism and a general lock mechanism.

Hereinafter, the configuration of the fitting detection system 1 will be described.

Vibration Sensor

The vibration sensor 10 is a sensor for detecting vibration. The vibration sensor 10 detects vibration data related to vibration. The vibration sensor 10 is, for example, a piezoelectric sensor that converts the force applied to the piezoelectric body into a voltage and detects the voltage as vibration data.

For example, the vibration sensor 10 is attached to a work glove worn by an operator. Specifically, the vibration sensor 10 is attached to the thumb portion of the work glove. Vibration data (voltage) is detected in response to vibration generated when an operator wearing work gloves grips and fits the connector. The vibration sensor 10 transmits the detected vibration data to the fitting detection device 20.

Fitting Detection Device

The fitting detection device 20 detects fitting of the connector based on the vibration data detected by the vibration sensor 10. Specifically, the fitting detection device 20 receives the vibration data from the vibration sensor 10 and detects whether or not the connector is normally fitted based on the vibration data.

In the present embodiment, the vibration sensor 10 and the fitting detection device 20 are communicably connected by wire.

2. Fitting Detection Device

The configuration of the fitting detection device 20 will be described in detail.

As illustrated in FIG. 1, the fitting detection device 20 includes a processor 21, a storage device 22, and a communication terminal 23.

Processor

The processor 21 is, for example, a central processing unit (CPU), a microprocessor, or other processing units capable of executing computer-executable instructions. The processor 21 executes the instructions stored in the storage device 22.

Storage Device

The storage device 22 is a storage medium that stores programs and data necessary for implementing the function of the fitting detection device 20. The storage device 22 can be implemented by, for example, a hard disk (HDD), an SSD, a RAM, a DRAM, a ferroelectric memory, a flash memory, a magnetic disk, or a combination thereof.

In the present embodiment, the storage device 22 stores a learned model 24.

Communication Terminal

The communication terminal 23 is a communication terminal that receives a signal from the vibration sensor 10. In the present embodiment, the communication terminal 23 may be connected to the vibration sensor 10 via a USB, HDMI (registered trademark), LAN, or the like.

3. Fitting Detection Method

Figure 2:
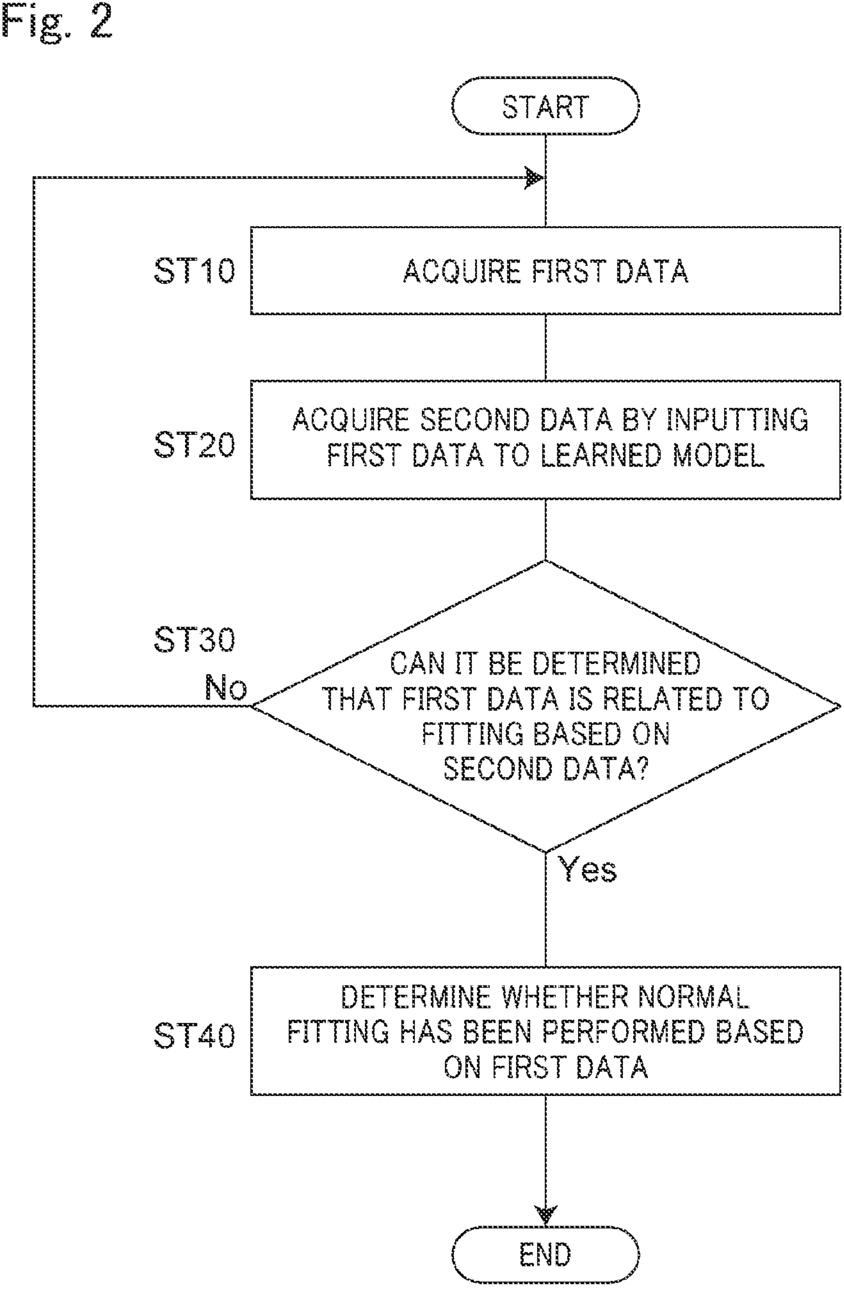
FIG. 2 is a flowchart illustrating an example of a fitting detection method according to the first embodiment.

The fitting detection method will be described with reference to FIG. 2. FIG. 2 is a flowchart illustrating an example of the fitting detection method according to the first embodiment.

As illustrated in FIG. 2, the fitting detection method includes steps ST10 to ST40. Steps ST10 to ST40 described above are performed by the fitting detection device 20.

In step ST10, the processor 21 acquires first data indicating information generated from vibration. The processor 21 acquires vibration data from the vibration sensor 10 and converts the vibration data into first data. In the present embodiment, the vibration data is a voltage, and the first data is the data of the amplitude (displacement amount) of vibration that changes with the lapse of time, that is, the amplitude waveform of vibration.

Figure 3:
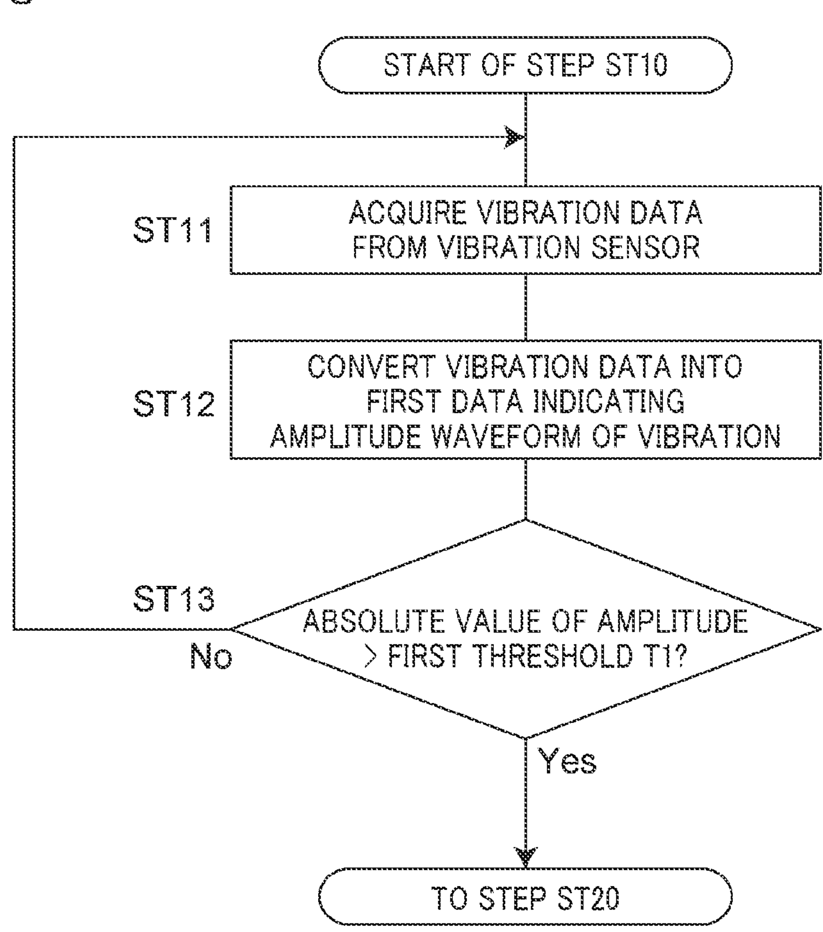
FIG. 3 is a flowchart illustrating an example of processing of acquiring first data.

Details of step ST10 will be described with reference to FIG. 3. FIG. 3 is a flowchart illustrating an example of processing of acquiring the first data. As illustrated in FIG. 3, step ST10 includes steps ST11 to ST13.

In step ST11, the processor 21 acquires vibration data from the vibration sensor 10 connected by wire via the communication terminal 23. In the present embodiment, since the vibration sensor 10 is a piezoelectric sensor, the vibration data is a voltage.

In step ST12, the processor 21 converts the vibration data into first data indicating the amplitude waveform of vibration. In the present embodiment, the processor converts a voltage that is vibration data into an amplitude (displacement amount) and acquires the first data indicating the amplitude waveform of vibration.

In step ST13, the processor 21 determines whether or not to execute step ST20 of acquiring the second data based on the amplitude of the first data and a first threshold T1.

Figure 4:
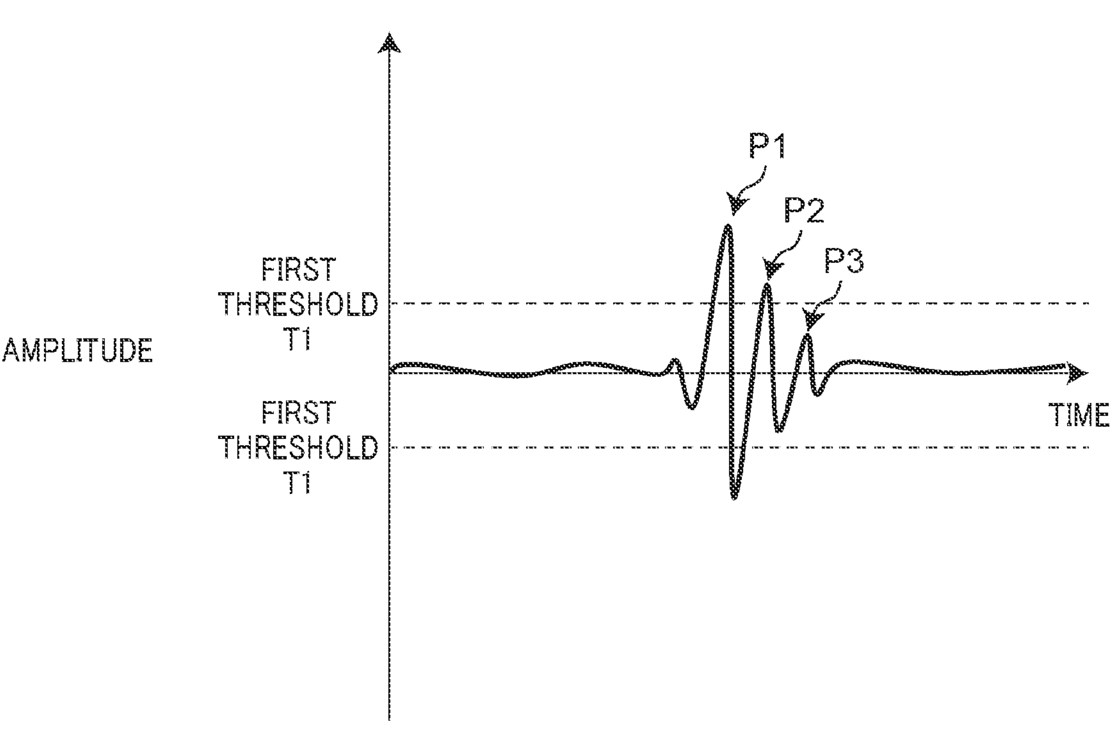
FIG. 4 is a schematic diagram illustrating an example of first data.
Figure 5:
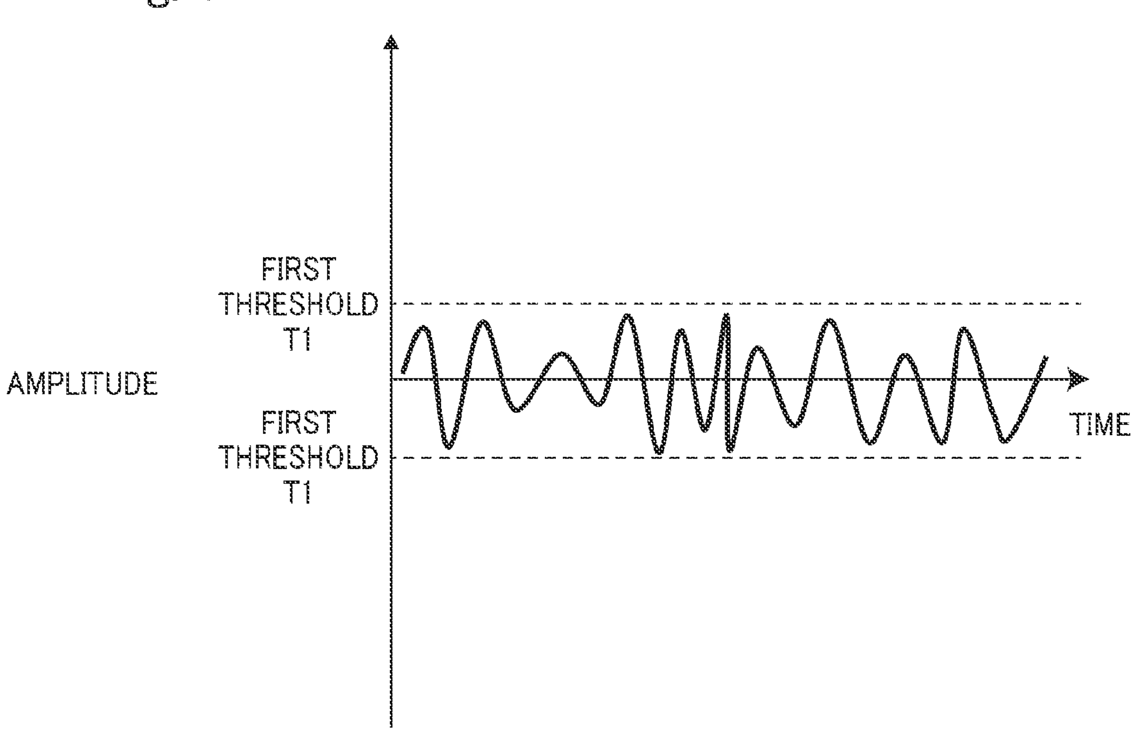
FIG. 5 is a schematic diagram illustrating another example of the first data.

FIGS. 4 and 5 are schematic diagrams illustrating an example of first data. FIG. 4 illustrates an example of the amplitude waveform of vibration caused by normal fitting of the connector. FIG. 5 illustrates an example of the amplitude waveform of small vibration such as noise.

As illustrated in FIG. 4, when the amplitude of the first data is larger than the absolute value of the first threshold T1, the processor 21 determines to execute processing of acquiring the second data. Specifically, when determining that the amplitude of the first data is larger than the absolute value of the first threshold T1, the processor 21 cuts out data in a time section including the amplitude waveform of vibration due to normal fitting of the connector in the first data and acquires the second data based on the first data of the cut out portion.

As illustrated in FIG. 5, when the amplitude of the first data is smaller than the absolute value of the first threshold T1, the processor 21 determines not to execute processing of acquiring the second data. In this case, the processor 21 continues the acquisition of the first data based on the vibration data.

In this manner, the processor 21 determines to execute step ST20 when the absolute value of the amplitude of the first data is larger than the absolute value of the first threshold T1. On the other hand, when the absolute value of the amplitude of the first data is equal to or less than the absolute value of the first threshold T1, the processor 21 determines not to execute step ST20. In this case, the process returns to step ST11.

Returning to FIG. 2, in step ST20, the processor 21 acquires the second data output from the learned model 24 by inputting the first data to the learned model 24. The second data is used as data for determining whether or not the first data is related to fitting.

The learned model 24 is a model having undergone machine learning using at least the amplitude waveform of vibration generated by normal fitting of the connector and data indicating that the vibration is related to the fitting as teacher data.

The "amplitude waveform of the vibration generated by the normal fitting of the connector" is the amplitude waveform decreasing in amplitude with the lapse of time and having at least two peaks. For example, as illustrated in FIG. 4, the amplitude waveform includes three peaks arranged in the order of a first peak P1, a second peak P2, and a third peak P3. The magnitude of the amplitude of the amplitude waveform decreases in the order of the first peak P1, the second peak P2, and the third peak P3.

The present embodiment will exemplify a case in which the learned model 24 is an autoencoder. In a case in which the learned model 24 is an autoencoder, the second data indicates information obtained by compressing and reconstructing the first data by the autoencoder.

Note that, in a case in which the learned model 24 is an autoencoder, the "data indicating that the vibration is related to fitting" has the same amplitude waveform as that of the vibration generated by the normal fitting of the connector, and thus, it is not necessary to perform learning using data indicating that the vibration is related to the fitting in addition to the amplitude waveform of the vibration generated by the normal fitting of the connector.

Figure 6:
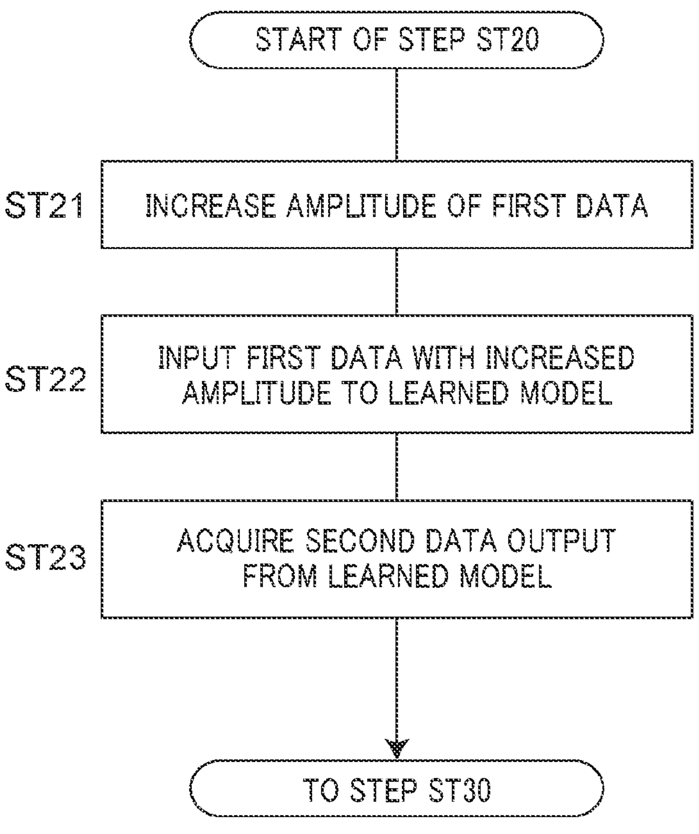
FIG. 6 is a flowchart illustrating an example of processing of acquiring second data.

Details of step ST20 will be described with reference to FIG. 6. FIG. 6 is a flowchart illustrating an example of processing of acquiring the second data. As illustrated in FIG. 6, step ST20 includes steps ST21 to ST23.

In step ST21, the processor 21 increases the amplitude of the first data. Specifically, the processor 21 normalizes the maximum amplitude of the first data to "1".

Figure 7:
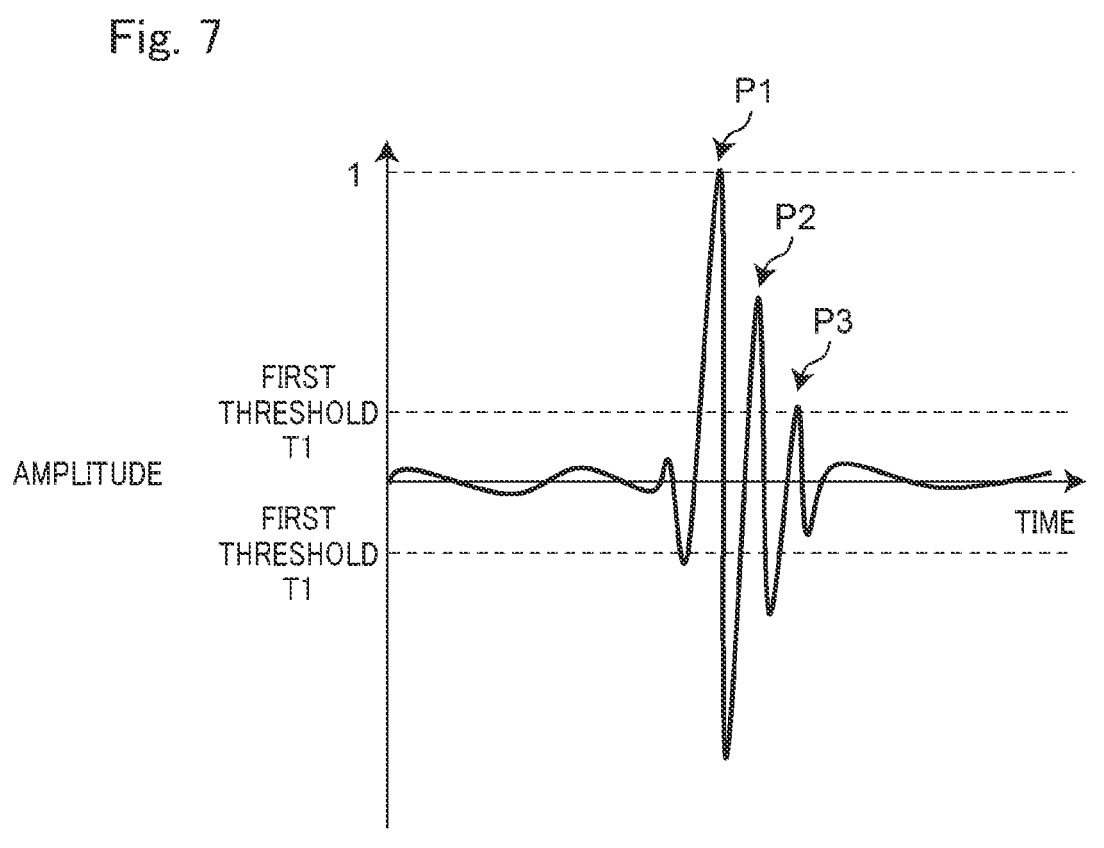

The processor 21 increases the amplitude of the first data before inputting the first data to the learned model 24. FIG. 7 is a schematic diagram illustrating an example of the first data of which amplitude is increased and is a diagram of the first data in FIG. 4 of which amplitude is increased. As illustrated in FIG. 7, the processor 21 performs normalization such that the maximum amplitude of the first data becomes "1". In the example illustrated in FIG. 7, the amplitude of the first data is increased such that the amplitude of the first peak P1 becomes "1".

In step ST22, the processor 21 inputs the first data with the increased amplitude to the learned model 24.

In step ST23, the processor 21 acquires the second data output from the learned model 24.

When the first data indicating the amplitude waveform of vibration is input, the learned model 24 compresses the first data and outputs the reconstructed amplitude waveform as the second data. The second data has the characteristic of the amplitude waveform of vibration generated by normal fitting of the connector and is a waveform approximate to the first data. For example, when the first data is the amplitude waveform of vibration generated by normal fitting of the connector, the second data has substantially the same amplitude waveform as that of the first data. When the first data is the amplitude waveform of vibration due to disturbance, the second data has the characteristic of the amplitude waveform of vibration caused by normal fitting of the connector but has an amplitude waveform different from that of the first data.

Figure 8:
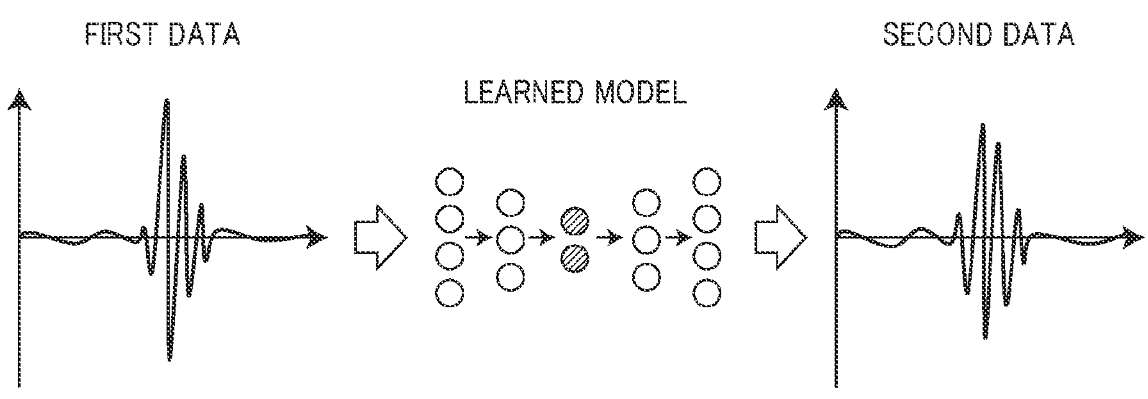
FIG. 8 is a schematic diagram illustrating an example of processing of a learned model.
Figure 9:
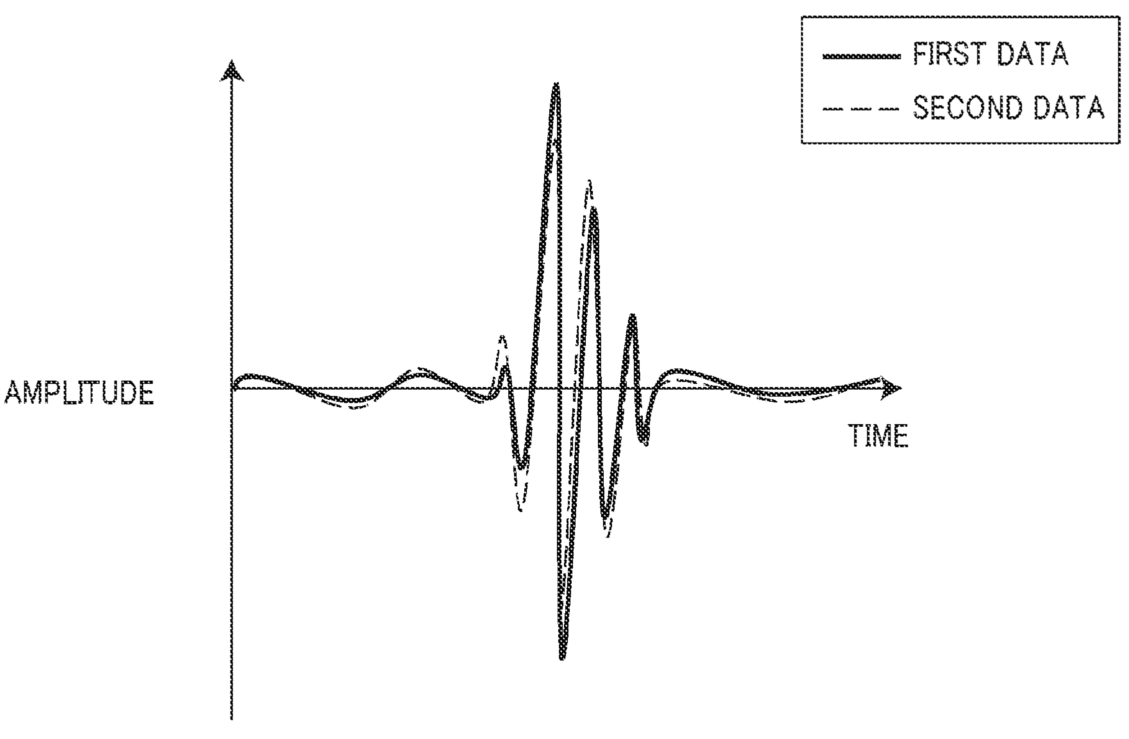
FIG. 9 is a schematic diagram illustrating the comparison between the first data and the second data illustrated in FIG. 8.

An example of processing of the learned model 24 will be described with reference to FIGS. 8 and 9. FIG. 8 is a schematic diagram illustrating an example of the second data output by the learned model 24 in a case in which the first data is the amplitude waveform of vibration due to normal fitting. FIG. 9 is a schematic diagram illustrating the comparison between the first data and the second data illustrated in FIG. 8.

As illustrated in FIG. 8, when the first data indicating the amplitude waveform of vibration due to normal fitting is input, the learned model 24 outputs the second data indicating an amplitude waveform substantially the same as that of the first data. As illustrated in FIG. 9, when the first data and the Second data illustrated in FIG. 8 are overlapped and compared, the first data and the second data are substantially superimposed on each other. Therefore, the difference between the first data and the second data, that is, the distortion is small.

As described above, when the first data indicating the amplitude waveform of vibration due to normal fitting is input, the learned model 24 outputs the second data indicating the amplitude waveform with less distortion (difference) than the first data.

Figure 10:
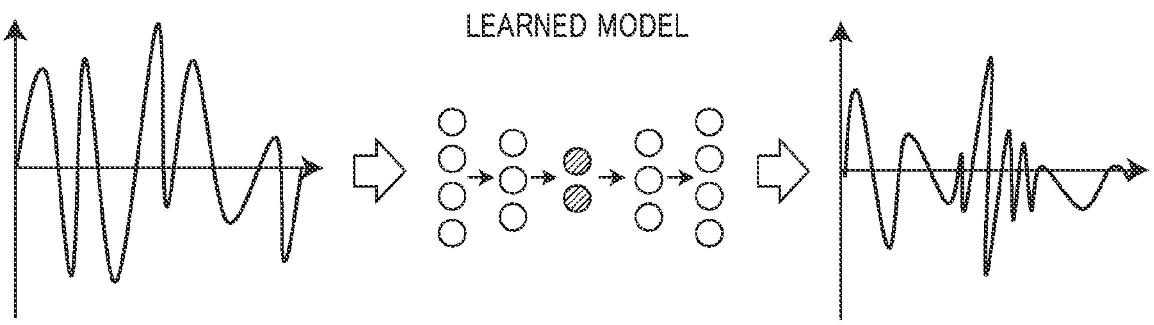
FIG. 10 is a schematic diagram illustrating another example of the processing of the learned model.
Figure 11:
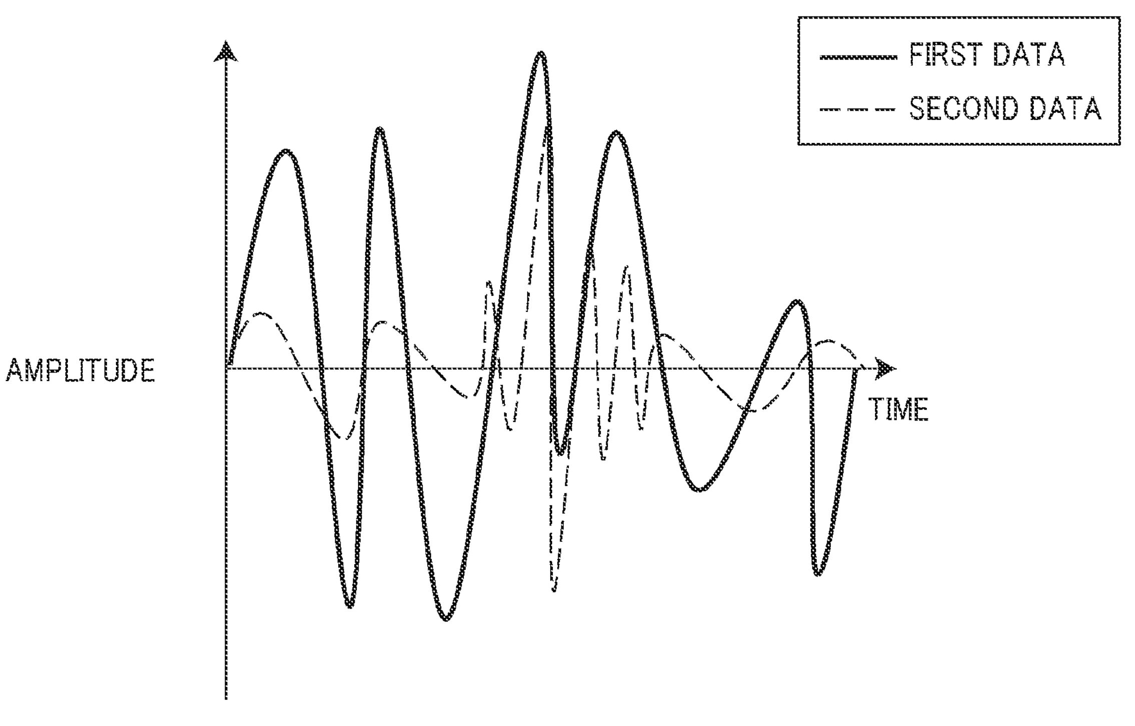
FIG. 11 is a schematic diagram illustrating comparison between the first data and the second data illustrated in FIG. 10.

Another example of the processing of the learned model 24 will be described with reference to FIGS. 10 and 11. FIG. 10 is a schematic diagram illustrating an example of the second data output by the learned model 24 in a case in which the first data is the amplitude waveform of vibration due to disturbance other than normal fitting. FIG. 11 is a schematic diagram illustrating the comparison between the first data and the second data illustrated in FIG. 10.

As illustrated in FIG. 10, when the first data indicating the amplitude waveform of vibration due to disturbance other than normal fitting is input, the learned model 24 outputs the second data indicating an amplitude waveform different from the first data. As illustrated in FIG. 11, when the first data and the second data illustrated in FIG. 10 are overlapped and compared, the first data and the second data have few overlapping portions. Therefore, the difference between the first data and the second data, that is, the distortion is larger than that in the case illustrated in FIGS. 8 and 9.

As described above, in an example in which the learned model 24 is an autoencoder, when the input first data is the amplitude waveform of vibration due to normal fitting, the output second data has substantially the same amplitude waveform as that of the first data. On the other hand, when the input first data is the amplitude waveform of vibration due to disturbance other than normal fitting, the output second data has an amplitude waveform different from that of the first data.

In step ST30, the processor 21 determines whether or not the first data is related to fitting on the basis of the second data. The processor 21 compares the first data with the second data and determines whether or not the first data is related to the fitting based on the result of the comparison. As a result, the processor 21 determines whether the first data is vibration related to fitting or vibration due to disturbance.

Figure 12:
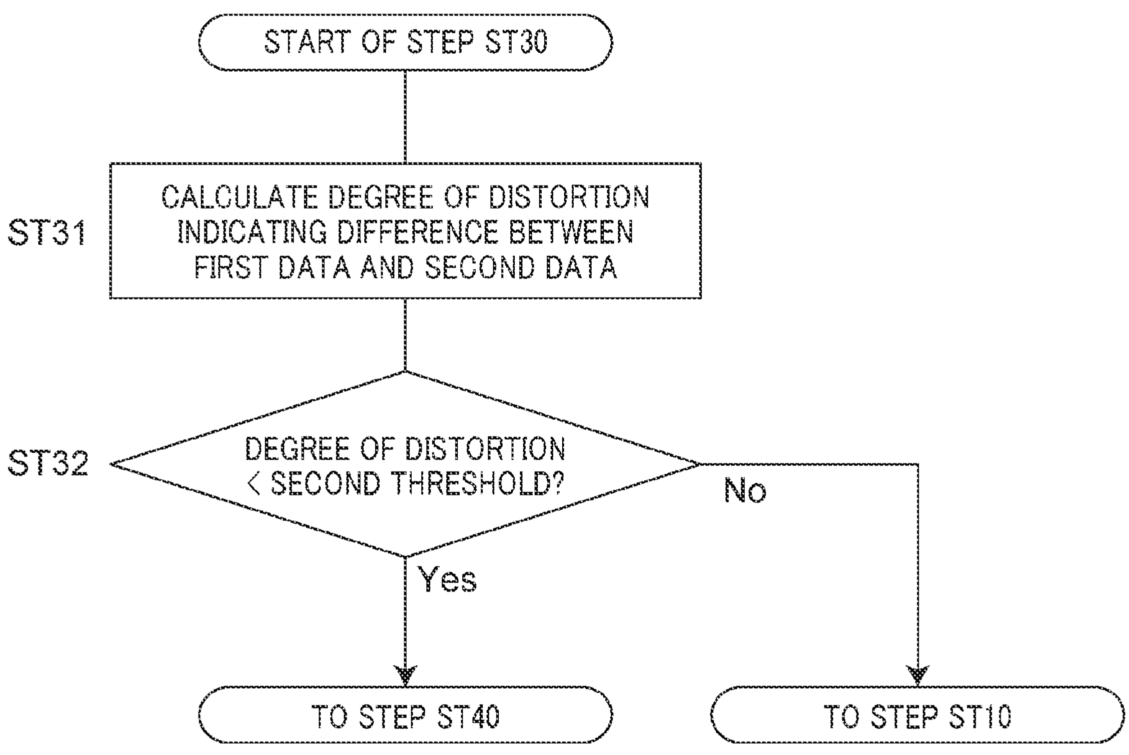
FIG. 12 is a flowchart illustrating an example of a process of determining whether or not the first data is related to fitting.

The processing in step ST30 will be described with reference to FIG. 12. FIG. 12 is a flowchart illustrating an example of a process of determining whether or not the first data is related to fitting. As illustrated in FIG. 12, step ST30 includes steps ST31 and ST32.

In step ST31, the processor 21 calculates the degree of distortion indicating the difference between the first data and the second data. The degree of distortion is a value indicating the degree of difference between the first data and the second data. The degree of distortion may be using, for example, an integration error or a mean square error.

In step ST32, the processor 21 determines whether or not the first data is related to fitting on the basis of the calculated degree of distortion. Specifically, the processor 21 determines whether or not the first data is the amplitude waveform of vibration related to fitting based on the comparison between the calculated degree of distortion and a second threshold T2.

The processor 21 determines that the first data is not related to fitting when the degree of distortion is greater than the second threshold T2. In this case, the process advances to step ST40. On the other hand, the processor 21 determines that the first data is related to fitting when the degree of distortion is equal to or less than the second threshold T2. In this case, the process returns to step ST10. Note that a criterion for determining whether the process advances to step ST40 or returns to step ST10 is not limited only to the magnitude relationship between the degree of distortion and the second threshold T2. For example, whether or not the degree of distortion falls within a predetermined threshold range (for example, the threshold T21 or more and the threshold T22 or less) may be used as a criterion for determining whether the process advances to step ST40 or returns to step ST10. In short, if it can be determined whether or not the first data is related to fitting on the basis of the degree of distortion, various means can be applied.

In step ST40, in a case in which the first data is related to fitting, the processor 21 determines whether or not fitting has been performed normally on the basis of the first data. Specifically, in response to the determination result that the first data is related to the fitting, the processor 21 determines whether or not the connector is normally fitted based on the first data.

Figure 13:
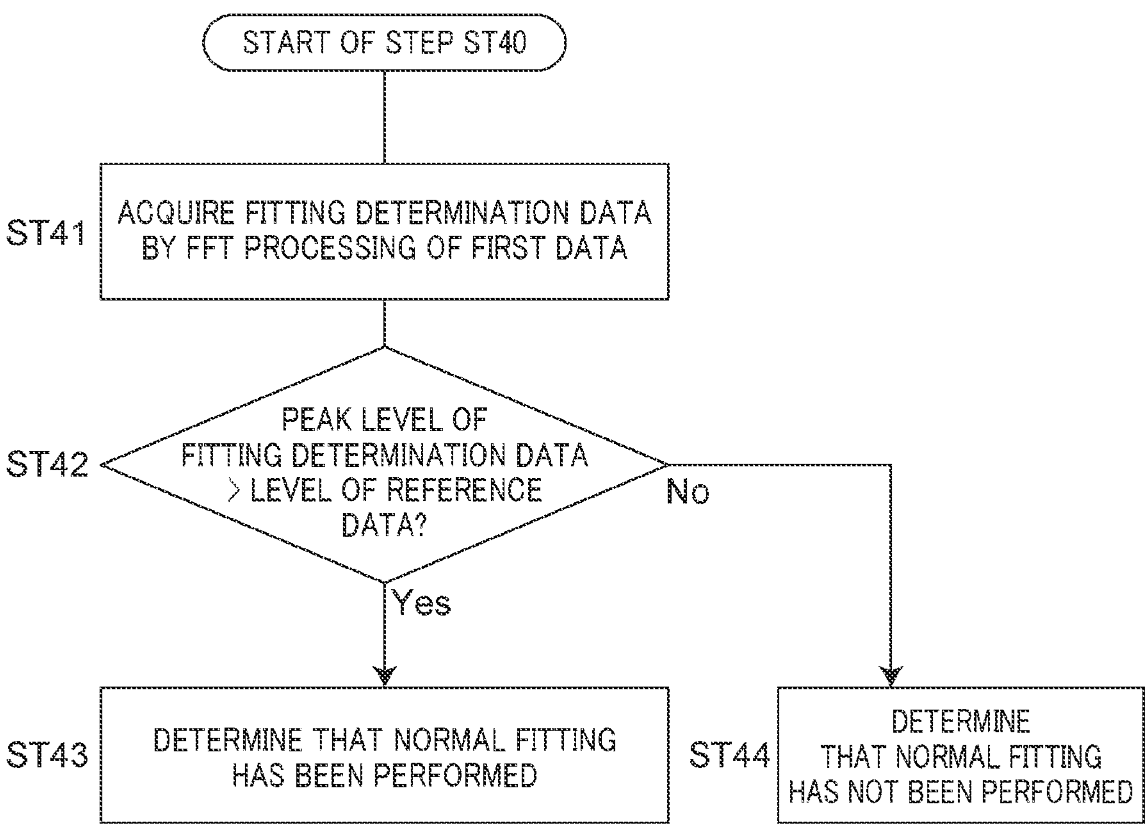
FIG. 13 is a flowchart illustrating an example of a process of determining whether or not fitting is normal.

The processing in step ST40 will be described with reference to FIG. 13. FIG. 13 is a flowchart illustrating an example of a process of determining whether or not fitting is normal. As illustrated in FIG. 13, step ST40 includes steps ST41 to ST44.

In step ST41, the processor 21 acquires fitting determination data by performing fast Fourier transform (FFT) processing on the first data. The processor 21 performs a fast Fourier transform on the first data to generate fitting determination data for determining whether or not the fitting is normal. The fitting determination data is data for determining whether or not the fitting is normal and is data indicating the ratio of frequency components included in the first data.

In step ST42, the processor 21 compares the fitting determination data with the reference data and determines whether or not the connector is normally fitted based on the comparison result. Specifically, the processor 21 compares the peak level of the fitting determination data with the level of the reference data. The reference data is stored in the storage device 22. A plurality of pieces of reference data may be stored in the storage device 22. Reference data may be selected from a plurality of pieces of reference data according to the shape, type, and size of the connector.

When the peak level of the fitting determination data is larger than the level of the reference data, the processor 21 determines that the connector is normally fitted as shown in step ST43.

When the peak level of the fitting determination data is equal to or lower than the level of the reference data, the processor 21 determines that the connector is not normally fitted as shown in step ST44.

As described above, the fitting detection method can detect whether or not the connector is normally fitted by performing steps ST10 to ST40.

4. Effects and Supplementary Remarks

The fitting detection method according to the first embodiment of the present disclosure has the following effects.

The fitting detection method according to the present disclosure includes step ST10 of acquiring the first data, step ST20 of acquiring the second data, step ST30 of determining whether or not the first data is related to fitting, and step ST40 of determining whether or not the connector is normally fitted. In step ST10 of acquiring the first data, the first data indicating the information generated from the vibration is acquired. In step ST20 of acquiring the second data, the second data output from the learned model 24 is acquired by inputting the first data to the learned model 24 having undergone machine learning using at least the information generated from the vibration generated by normal fitting as teacher data. In step ST30 of determining whether or not the first data is related to the fitting, it is determined whether or not the first data is related to the fitting based on the second data. In step ST40 of determining whether or not the connector is normally fitted, it is determined whether or not the connector is normally fitted based on the first data when the first data is related to the fitting.

With such a configuration, normal fitting can be efficiently detected. In the fitting detection method, since it is possible to determine whether or not the first data is related to vibration due to fitting on the basis of the second data output from the learned model 24, it is possible to eliminate vibration due to disturbance. As a result, the load of the determination processing becomes relatively light, and the determination time also becomes short. In addition, in the fitting detection method, it is possible to reduce the possibility of erroneously determining that the fitting is normal based on the vibration due to the disturbance, and to improve the determination accuracy.

In a case in which the first data indicates an amplitude waveform of vibration, and the learned model 24 has undergone machine learning using at least the amplitude waveform of vibration generated by normal fitting as teacher data, step ST10 of acquiring the first data determines whether or not to execute processing of acquiring the second data based on the amplitude of the first data and the first threshold T1. With such a configuration, in step ST10 of acquiring the first data, small vibration such as noise can be eliminated. As described above, it is possible to determine at an early stage in step ST10 not to perform the processing In steps ST20 to ST40 with respect to vibration such as noise which is clearly not related to the fitting. This makes it possible to reduce unnecessary determination processing.

In a case in which the learned model 24 is an autoencoder, the second data indicates information obtained by compressing and reconstructing the first data by the autoencoder. In step ST30 of determining whether or not the first data is related to the fitting, the first data and the second data are compared, and it is determined whether or not the first data is related to the fitting based on the result of the comparison. With such a configuration, it is possible to determine whether or not the first data is related to the fitting based on the comparison between the first data and the second data. This makes it possible to easily determine whether or not the first data is related to vibration due to fitting.

Step ST30 of determining whether or not the first data is related to the fitting includes step ST31 of calculating the degree of distortion indicating the difference between the first data and the second data and step ST32 of determining whether or not the first data is related to the fitting based on the degree of distortion. With such a configuration, the first data and the second data can be easily compared, and fitting determination can be efficiently performed.

The amplitude waveform of the vibration generated by normal fitting decreases in amplitude with the lapse of time and has at least two waveform peaks. In the fitting structure, since fitting occurs upon deformation of the elastic portion, at least two or more waveform peaks occur due to the vibration of the elastic portion. Therefore, with such a configuration, the determination accuracy can be improved.

The first data includes the amplitude waveform of vibration due to disturbance other than normal fitting. In a case in which the first data includes the amplitude waveform of vibration due to disturbance, in step ST30 of determining whether or not the first data is related to fitting, it is determined that the first data is not related to fitting. With such a configuration, vibration due to disturbance can be eliminated, and normal fitting can be efficiently detected.

Step ST20 of acquiring the second data includes step ST21 of increasing the amplitude of the first data and step ST22 of inputting the first data having the increased amplitude to the learned model 24. Such a configuration facilitates the comparison between the first data and the second data and can improve the determination accuracy. For example, when the amplitude is small when the first data and the second data are compared, the error between the first data and the second data becomes small, and it is difficult to compare the first data and the second data. When the amplitude is large when the first data and the second data are compared, the error between the first data and the second data increases, and the first data and the second data are easily compared.

In addition, the fitting detection system 1 and the fitting detection device 20 according to the first embodiment of the present disclosure also achieve effects similar to those of the fitting detection method described above.

SECOND EMBODIMENT

The configuration of a fitting detection system 1A according to the second embodiment will be described with reference to FIG. 14.

In the second embodiment, differences from the first embodiment will be mainly described. In the second embodiment, the same or equivalent components as those of the first embodiment will be described with the same reference numerals. In the second embodiment, descriptions overlapping the first embodiment will be omitted.

The second embodiment differs from the first embodiment in including a display 30.

In the second embodiment, the detection result obtained by a fitting detection device 20 is displayed on the display 30.

Figure 14:
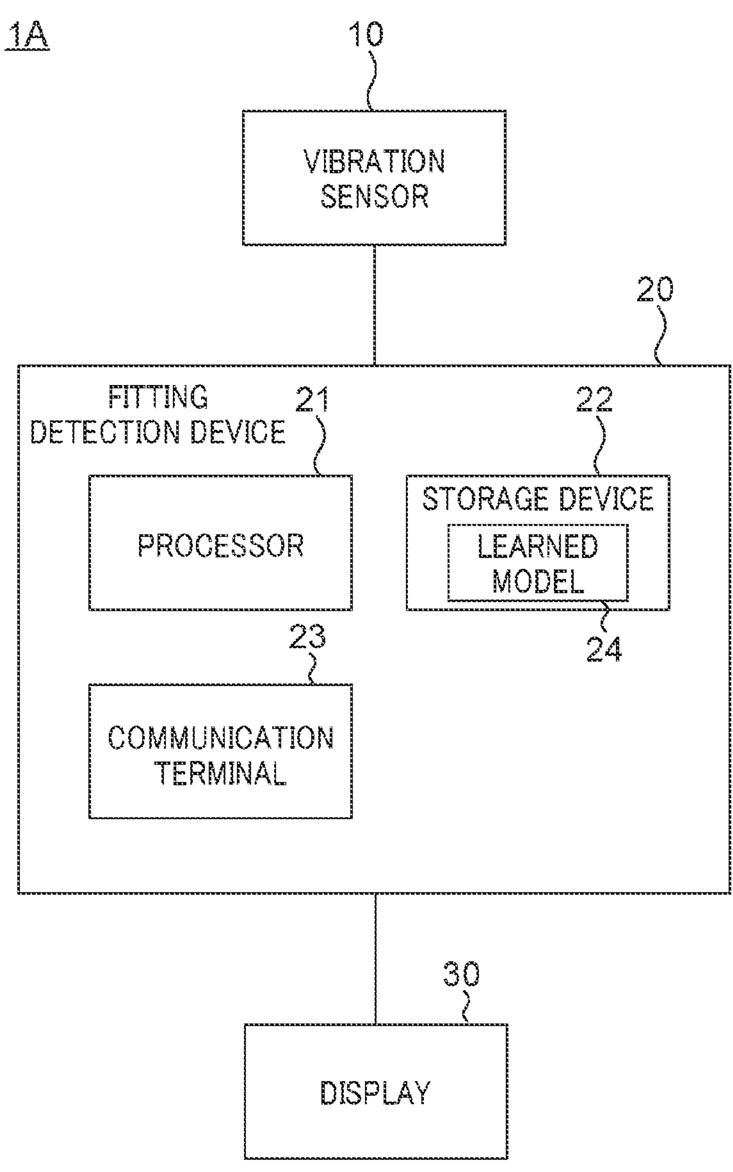
FIG. 14 is a schematic block diagram illustrating an example of a fitting detection system according to the second embodiment.

FIG. 14 is a schematic block diagram illustrating an example of the fitting detection system 1A according to the second embodiment. As illustrated in FIG. 14, the fitting detection system 1A includes the display 30 communicably connected to the fitting detection device 20.

Display

The display 30 displays the detection result obtained by the fitting detection device 20. Specifically, the display 30 displays a determination result as to whether or not the connector is normally fitted.

For example, the display 30 may visually display a determination result as to whether or not the connector has been normally fitted. "Visually displaying" includes displaying in a visually recognizable manner using, for example, characters, images, videos, and the like.

The display 30 and the fitting detection device 20 are connected via a communication terminal 23 so as to be able to communicate with each other by wire.

Figure 15:
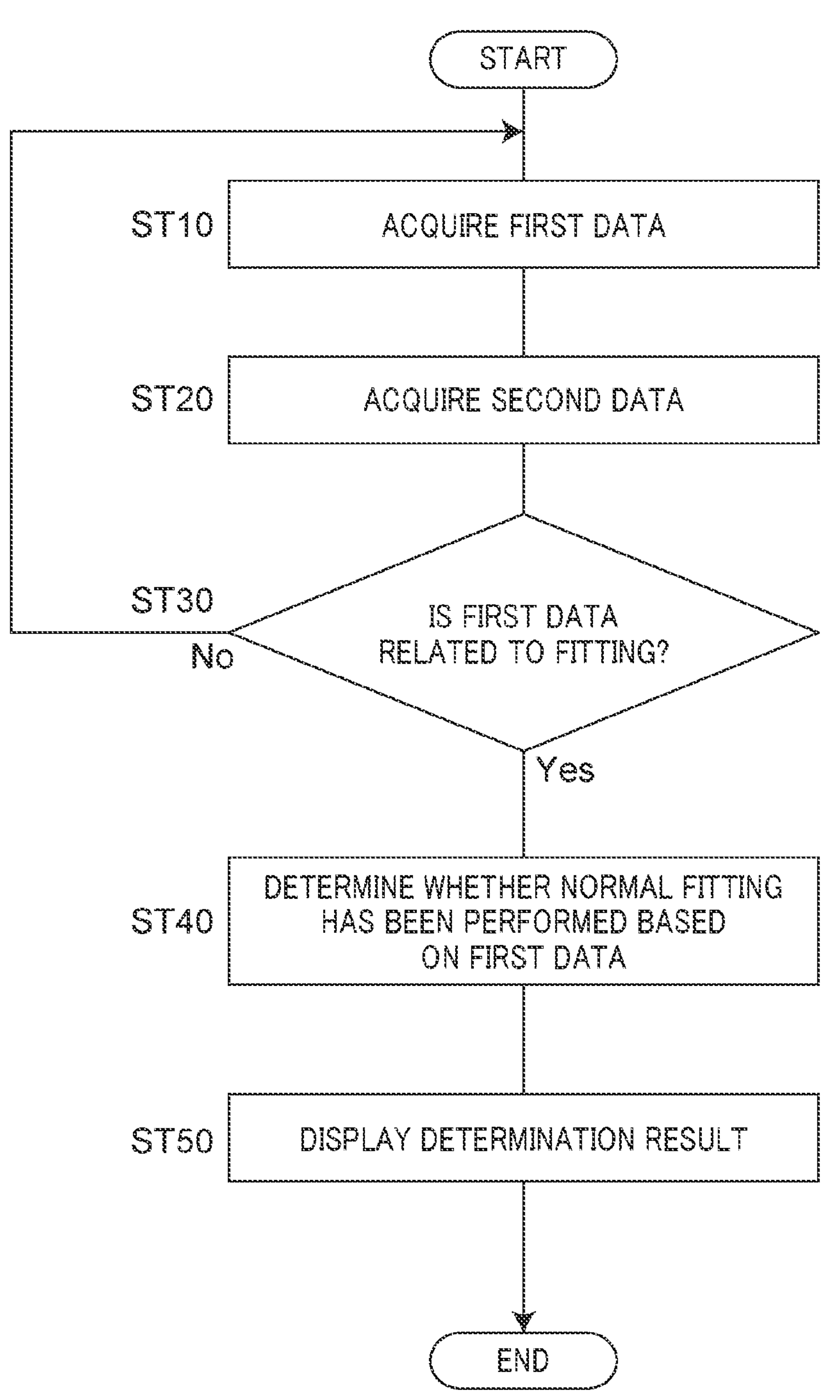
FIG. 15 is a flowchart illustrating an example of a fitting detection method according to the second embodiment.

A fitting detection method according to the second embodiment will be described with reference to FIG. 15. FIG. 15 is a flowchart illustrating an example of the fitting detection method according to the second embodiment.

As illustrated in FIG. 15, the second embodiment differs from the first embodiment in including step ST50 of presenting a determination result. Note that steps ST10 to ST40 illustrated in FIG. 15 are similar to steps ST10 to ST40 illustrated in FIG. 9, and thus a description thereof is omitted.

In step ST50, the display 30 displays a fitting determination result. The display 30 receives the determination result of the determination performed in step ST40 from the fitting detection device 20 via the communication terminal 23 and presents the determination result.

The fitting detection method according to the second embodiment of the present disclosure has the following effects.

The fitting detection method according to the present disclosure further includes step ST50 of displaying a determination result as to whether or not fitting is normally performed. Such a configuration allows the operator to easily know a determination result. In addition, since vibration due to disturbance that is not related to fitting is excluded from determination processing, the number of times of displaying the determination result based on the vibration due to the disturbance can be reduced. This improves the convenience.

The fitting detection system 1A according to the second embodiment of the present disclosure also has the same effect as the fitting detection method described above.

Note that the fitting detection system 1A may include a lamp and/or a speaker that presents a determination result. The fitting detection system 1A may include a lamp and/or a speaker without including the display 30. The lamp may display a determination result as to whether or not the connector is normally fitted by lighting, blinking, and color-coding. For example, when the connector is normally fitted, the lamp may be turned on or a green lamp may be turned on. When the connector is not normally fitted, the lamp may blink or a red lamp may be turned on. The lamp may be an LED. The speaker may notify a determination result as to whether or not the connector is normally fitted by sound.

THIRD EMBODIMENT

The configuration of a fitting detection system 1B according to the third embodiment will be described with reference to FIG. 16.

In the third embodiment, differences from the second embodiment will be mainly described. In the third embodiment, the same or equivalent components as those of the second embodiment will be described with the same reference numerals. In the third embodiment, descriptions overlapping the second embodiment will be omitted.

The third embodiment differs from the second embodiment in that a fitting detection device 20 wirelessly communicates with a vibration sensor 10 and a display 30.

Figure 16:
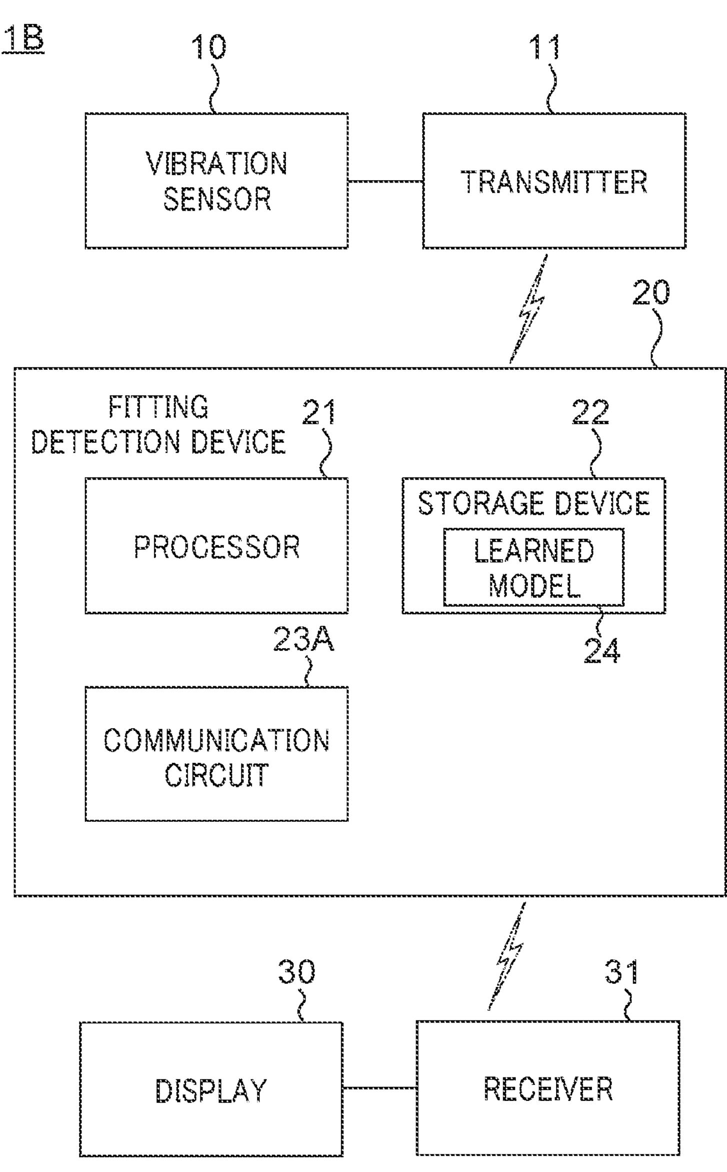
FIG. 16 is a schematic block diagram illustrating an example of a fitting detection system according to a third embodiment.

FIG. 16 is a schematic block diagram illustrating an example of the fitting detection system 1B according to the third embodiment. As illustrated in FIG. 16, the fitting detection system 1B further includes a transmitter 11 that transmits the vibration data of the vibration sensor 10 and a receiver 31 that receives the detection result obtained by the fitting detection device 20. In addition, the fitting detection device 20 includes a communication circuit 23A.

The communication circuit 23A is a circuit that performs wireless communication with an external device in conformity with a predetermined communication standard. The predetermined communication standard includes, for example, Wi-Fi (registered trademark), Bluetooth (registered trademark), and the like. The communication circuit 23A exchanges data with the transmitter 11 and the receiver 31 by wireless communication.

The transmitter 11 transmits the vibration data detected by the vibration sensor 10 to the fitting detection device 20. Specifically, the transmitter 11 is wirelessly connected to the communication circuit 23A of the fitting detection device 20. The transmitter 11 includes a circuit that performs wireless communication with the fitting detection device 20 in conformity with a predetermined communication standard. In the present embodiment, the transmitter 11 transmits the data of the voltage detected by the vibration sensor 10 to the communication circuit 23A.

The receiver 31 receives the detection result obtained by the fitting detection device 20. Specifically, the receiver 31 is wirelessly connected to the communication circuit 23A and receives the determination result. The detection result received by the receiver 31 is transmitted to the display 30. The receiver 31 includes a circuit that performs wireless communication with the fitting detection device 20 in conformity with a predetermined communication standard.

The fitting detection system 1B according to the third embodiment of the present disclosure can achieve the following effects.

In the fitting detection system 1B according to the present disclosure, the fitting detection device 20 includes the communication circuit 23A that performs wireless communication. The fitting detection device 20 wirelessly receives vibration data from the vibration sensor 10 via the communication circuit 23A. In addition, the fitting detection device 20 wirelessly transmits the fitting determination result to the display 30 via the communication circuit 23A. Such a configuration improves the convenience.

FOURTH EMBODIMENT

The configuration of a fitting detection system 1C according to the fourth embodiment will be described with reference to FIG. 17.

In the fourth embodiment, differences from the third embodiment will be mainly described. In the fourth embodiment, the same or equivalent components as those of the third embodiment will be described with the same reference numerals. In the fourth embodiment, descriptions overlapping the third embodiment will be omitted.

The fourth embodiment differs from the third embodiment in including a server 40 and acquiring the second data by using the server 40.

In the fourth embodiment, a learned model 24 is stored on the server 40. The server 40 receives the first data from a fitting detection device 20 via wireless communication. The server 40 acquires the second data by inputting the received first data to the learned model 24. The second data is transmitted from the server 40 to the fitting detection device 20. In other words, in the fourth embodiment, step ST20 of acquiring the second data illustrated in FIG. 15 is performed by the server 40.

Figure 17:
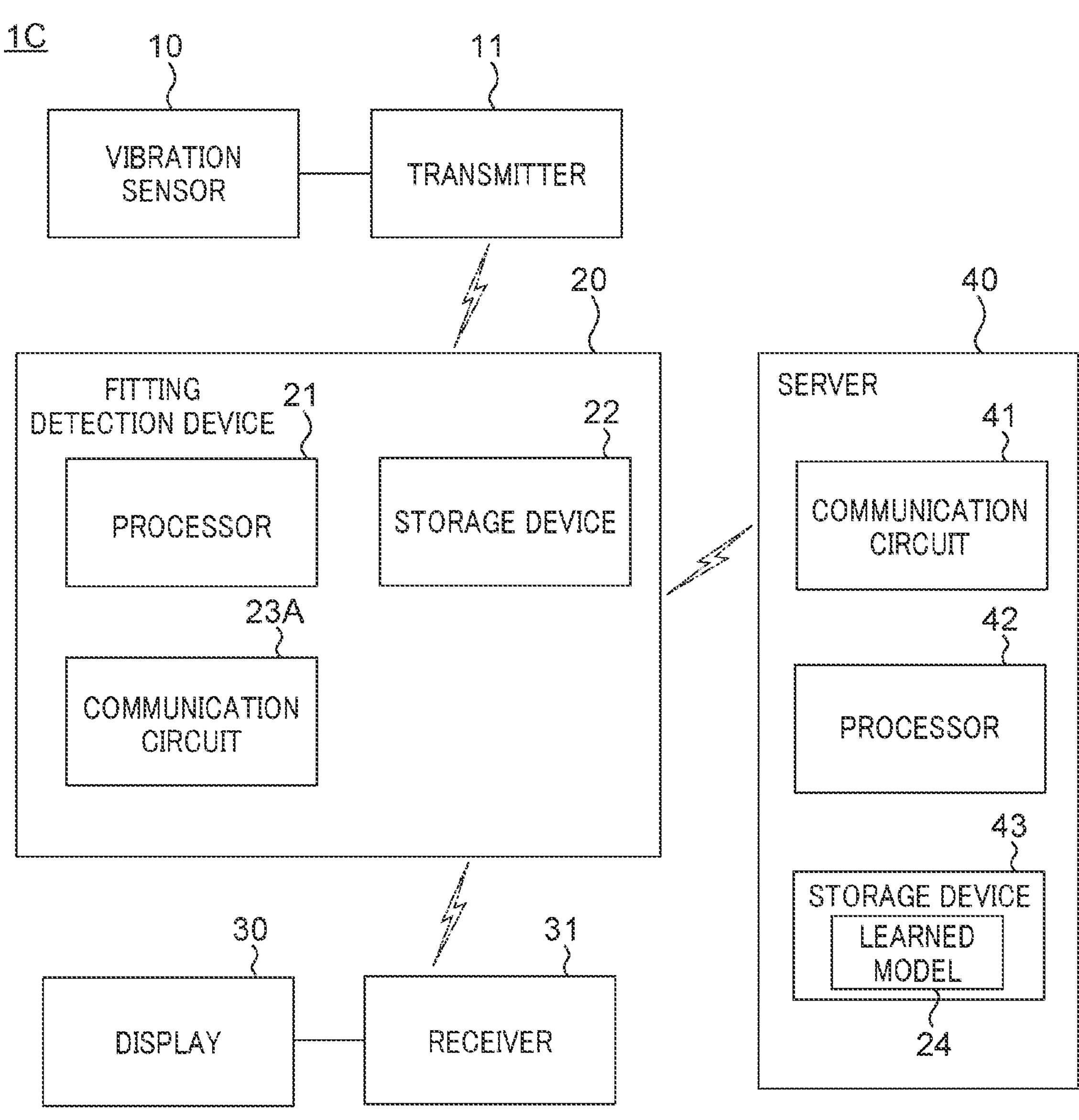
FIG. 17 is a schematic block diagram illustrating an example of a fitting detection system according to a fourth embodiment.

FIG. 17 is a schematic block diagram illustrating an example of the fitting detection system 1C according to the fourth embodiment. As illustrated in FIG. 17, the fitting detection system 1C includes the server 40 connected via wireless communication.

Server

The server 40 includes a communication circuit 41, a processor 42, and a storage device 43.

The communication circuit 41 is a circuit that performs wireless communication with the fitting detection device 20 in conformity to a predetermined communication standard. The predetermined communication standard includes, for example, Wi-Fi (registered trademark), Bluetooth (registered trademark), and the like. The communication circuit 41 exchanges data with the communication circuit 23A of the fitting detection device 20 by wireless communication. In the present embodiment, the communication circuit 41 receives the first data from the fitting detection device 20 and transmits the second data to the fitting detection device 20.

The processor 42 is, for example, a central processing unit (CPU), a microprocessor, or other processing units capable of executing computer-executable instructions. The processor 42 executes the instructions stored in the storage device 43.

The storage device 43 is a storage medium that stores programs and data necessary for implementing the function of the server 40. The storage device 43 stores the learned model 24. The storage device 43 can be implemented by, for example, a hard disk (HDD), an SSD, a RAM, a DRAM, a ferroelectric memory, a flash memory, a magnetic disk, or a combination thereof.

In the fitting detection system 1C, the first data is transmitted to the server 40 via the communication circuit 23A of the fitting detection device 20. The server 40 receives the first data via this communication circuit 41. In the server 40, the processor 42 acquires the second data output from the learned model 24 by inputting the first data to the learned model 24 stored in the storage device 43. The second data is transmitted to the fitting detection device 20 via the communication circuit 41. The fitting detection device 20 receives the second data via communication circuit 23A. The second data is sent to the fitting detection device 20, and determination processing is performed.

The fitting detection system 1C according to the fourth embodiment of the present disclosure can achieve the following effects.

The fitting detection system 1C according to the present disclosure includes the server 40 connected via wireless communication. The learned model 24 is stored in the storage device 43 of the server 40. The first data is transmitted to the server 40 via wireless communication, and the second data is obtained by inputting the first data to the learned model 24 by the processor 42 of the server 40.

Such a configuration can acquire the second data by using the server 40 and hence improves the convenience.

The present embodiment has exemplified the case in which the server 40 performs step ST20 of acquiring the second data illustrated in FIG. 15. However, the present invention is not limited to this. For example, the server 40 may perform steps ST30 and/or ST40 of performing determination illustrated in FIG. 15.

In a case in which the server 40 performs step ST30 of performing determination illustrated in FIG. 15, the server 40 may transmit a determination result as to whether or not the first data is related to fitting to the fitting detection device 20 via the communication circuit 41.

In a case in which the server 40 performs step ST40 of performing determination illustrated in FIG. 15, the server 40 may transmit a determination result as to whether or not the first data is related to fitting or a determination result as to whether or not the first data is related to normal fitting to the fitting detection device 20 via the communication circuit 41.

As a further modification, the server 40 and the plurality of fitting detection devices 20 may be connected. This makes it possible to perform learning and determination on the basis of data acquired in various environments and hence further improves the accuracy of the determination processing. In addition, causing the server side to perform the determination processing part using the learned model with a relatively heavy processing load can reduce the processing on the client side and flexibly cope with the level of the determination processing demand through adjustment of the processing capacity of the server.

OTHER EMBODIMENTS

As described above, the above embodiments have been described as examples of the technique disclosed in the present application. However, the technique in the present disclosure is not limited to this and can be applied to embodiments in which changes, substitutions, additions, omissions, and the like are made as appropriate. Therefore, other embodiments will be exemplified below.

The above embodiment has exemplified the case in which the vibration sensor 10 and the display 30 are separate from the fitting detection device 20. However, the vibration sensor 10 may be included in the fitting detection device 20. The display 30 may be included in the fitting detection device 20.

The above embodiment has exemplified the case in which the vibration sensor 10 is a piezoelectric sensor, and vibration data is a voltage. However, the vibration sensor 10 is not limited to a piezoelectric sensor, and vibration data is not limited to a voltage. The vibration sensor 10 only needs to be able to detect vibration data capable of detecting fitting. For example, as the vibration sensor 10, a sound sensor such as a directional microphone or a motion sensor such as an acceleration sensor may be used. However, in a case in which a piezoelectric sensor is used as the vibration sensor 10, mixing of environmental sound is easily suppressed, and thus, an erroneous reaction due to disturbance is reduced as a whole system. Vibration data may be any data related to vibration.

The above embodiment has exemplified the case in which the learned model 24 is an autoencoder, and "data indicating that vibration is related to fitting" used as teacher data has the same amplitude waveform as that of vibration generated by normal fitting. However, the learned model 24 is not limited to an autoencoder. For example, the learned model 24 may be a neural network other than an autoencoder or a model, a classifier, or the like constructed by or conventional classical machine learning. However, in the field of fitting in which elements such as various mechanisms, applications, and materials are complicatedly intertwined, it is difficult to collect all the influences of disturbance exerted on them as teacher data to construct a learned model, and thus, it is possible to perform determination more easily and accurately by using an autoencoder. The "data indicating that vibration is related to fitting" may be, for example, a label indicating a fitting state or the like. A fitted state may include, for example, a normal fitted state, a half fitted state, and an unfitted state. "Semi-fitted" means partially engaged but not fully fitted. "Unfitted" means a state in which fitting is not performed.

The above embodiment has exemplified the case in which the teacher data of the learned model 24 is the amplitude waveform of vibration generated by the normal fitting of the connector and the data indicating that the vibration is related to the fitting. However, the teacher data of the learned model 24 is not limited to them. For example, the teacher data of the learned model 24 may include the vibration waveform of vibration due to disturbance. Such a configuration can improve the determination accuracy.

Furthermore, the learned model 24 may be additionally trained and updated. For example, the first data in a case in which it is determined that the fitting is normal may be input to the learned model 24 as teacher data. As a result, the learned model 24 may be updated by additionally training. After the learned model 24 is updated, the second data may be acquired using the updated learned model 24. Such a configuration can more efficiently detect the normal fitting. In addition, although the example of using the learned model has been described here, the learned model itself may not be used and may be replaced with a function expression of a so-called program language. In addition, the learned model is not limited to the temporarily created learned model, and a second model derived from an existing learned model may be used. Needless to say, the second model may be created using pruning, or may be a learned model newly created in a step called distillation. In the present disclosure, these models and/or a model that comprehensively performs output using a plurality of these models are also referred to as learned models.

The above embodiment has exemplified the case in which the amplitude waveform of vibration generated by normal fitting is the amplitude waveform that decreases in amplitude with the lapse of time and has three waveform peaks. However, the amplitude waveform of vibration generated by normal fitting may change depending on, for example, the type, size, shape, and material of the connector.

The above embodiment has exemplified the case in which the first data is the amplitude waveform of vibration. However, the first data is not limited to the amplitude waveform of vibration. The first data may be data indicating information generated from vibration. For example, the first data may be a frequency component of vibration. When the first data is a frequency component of vibration, the second data may also be a frequency component. In addition, in a case in which the first data is a frequency component of vibration, the teacher data of the learned model 24 may also be a frequency component.

The above embodiment has exemplified the case in which the processor 21 determines whether or not to execute the processing of acquiring the second data based on the amplitude of the first data and the first threshold T1. However, the processor 21 may not determine whether or not to execute the process of acquiring the second data.

The above embodiment has exemplified the case in which the processor 21 increases the amplitude of the first data as the preprocessing for the first data. However, the processor 21 may not increase the amplitude of the first data. As preprocessing for the first data, processing of converting the first data into the envelope of the first data may be performed. In addition, as preprocessing for the first data, processing of converting the first data into a value indicating information (the distance between peaks or the like) related to between two or more peaks included in the first data may be performed.

The above embodiment has exemplified the case in which the processor 21 calculates the degree of distortion between the first data and the second data and determines whether or not the first data is related to fitting based on the degree of distortion and the second threshold T2. However, the processor 21 may determine whether or not the first data is related to fitting by a method other than calculating the degree of distortion. The processor 21 only needs to be able to determine whether or not the first data is related to fitting on the basis of the second data.

The above embodiment has exemplified the case in which the processor 21 determines whether or not the connector is normally fitted by comparing the fitting determination data obtained by performing FFT processing on the first data with the reference data. However, the processor 21 may determine whether or not normal fitting has been performed by a method other than the FFT processing. The processor 21 only needs to be able to determine whether or not the fitting is normally performed based on the first data.

The above embodiment has exemplified the case in which steps ST10 to ST50 of the fitting detection method are separate steps. However, a plurality of steps may be integrated. For example, steps ST10 and ST20 may be integrated. Steps ST30 and ST40 may be integrated.

The above embodiment has exemplified the case in which fitting is used to physically and electrically connect devices mounted on an automobile or the like. However, in the present specification, "fitting" only needs to provide at least physical contact. For example, fitting may be used for an opening/closing component of a door or an opening/closing component of the safety lid of a factory machine. When fitting is used for an opening/closing component of a door, the fitting detection method, the fitting detection device, and the fitting detection system according to the present disclosure may be applied to the detection of the open/closed state of the door. When fitting is used for an opening/closing of the safety lid of a factory machine, the fitting detection method, the fitting detection device, and the fitting detection system according to the present disclosure may be applied to the detection of the open/closed state of the safety lid.

Outline of Embodiment (1) A fitting detection method according to the present disclosure is a fitting detection method for detecting fitting which includes acquiring first data indicating information generated from vibration, acquiring second data output from a learned model by inputting the first data to the learned model having undergone machine learning using at least information generated from vibration generated by normal fitting as teacher data, determining whether or not the first data is related to fitting based on the second data, and determining whether or not normal fitting is performed based on the first data when the first data is related to fitting.

(2) In the fitting detection method according to (1), in a case in which the first data indicates an amplitude waveform of vibration, and the learned model has undergone machine learning using at least the amplitude waveform of vibration generated by normal fitting as teacher data, acquiring the first data may determine whether or not to execute processing of acquiring the second data based on the amplitude of the first data and the first threshold.

(3) In the fitting detection method according to (1) or (2), the learned model may be an autoencoder, the second data may indicate information obtained by compressing and reconstructing the first data using the autoencoder, and determining whether or not the first data is related to fitting may include comparing the first data with the second data and determining whether or not the first data is related to the fitting based on a result of the comparison.

(4) In the fitting detection method according to (3), determining whether or not the first data related to the fitting may include calculating a degree of distortion indicating a difference between the first data and the second data and determining whether or not the first data related to the fitting based on the degree of distortion.

(5) In the fitting detection method according to any one of (1) to (4), the amplitude waveform of the vibration generated by normal fitting may decrease in amplitude with a lapse of time and have at least two waveform peaks.

(6) In the fitting detection method according to any one of (1) to (5), the first data includes an amplitude waveform of vibration due to disturbance other than the normal fitting, and when the first data includes the amplitude waveform of vibration due to the disturbance, it may be determined that the first data is not related to fitting.

(7) In the fitting detection method according to any one of (1) to (6), acquiring the second data may include increasing the amplitude of the first data and inputting the first data with the increased amplitude to the learned model.

(8) The fitting detection method according to any one of (1) to (7) may further include displaying a termination result as to whether or not the fitting is normally performed.

(9) A fitting detection device according to the present disclosure is a fitting detection device for detecting fitting which includes a processor and a storage device configured to store an instruction executable by the processor. The instruction includes acquiring first data indicating information generated from vibration, acquiring second data output from a learned model by inputting the first data to the learned model having undergone machine learning using at least information generated from vibration generated by normal fitting as teacher data, determining whether or not the first data is related to fitting based on the second data; and determining whether or not normal fitting is performed based on the first data when the first data is related to fitting.

(10) In the fitting detection device according to (9), in a case in which the first data indicates an amplitude waveform of vibration, and the learned model has undergone machine learning using at least the amplitude waveform of vibration generated by normal fitting as teacher data, acquiring the first data may determine whether or not to execute processing of acquiring the second data based on the amplitude of the first data and the first threshold.

(11) In the fitting detection device according to (9) or (10), the learned model may be an autoencoder, the second data may indicate information obtained by compressing and reconstructing the first data using the autoencoder, and determining whether or not the first data is related to fitting may include comparing the first data with the second data and determining whether or not the first data is related to the fitting based on a result of the comparison.

(12) In the fitting detection device according to (11), determining whether or not the first data related to the fitting may include calculating a degree of distortion indicating a difference between the first data and the second data and determining whether or not the first data related to the fitting based on the degree of distortion.

(13) In the fitting detection device according to (9) to (12), the amplitude waveform of the vibration generated by normal fitting may decrease in amplitude with a lapse of time and have at least two waveform peaks.

(14) In the fitting detection device according to (9) to (13), the first data may include an amplitude waveform of vibration due to disturbance other than the normal fitting, and when the first data includes the amplitude waveform of vibration due to the disturbance, it may be determined that the first data is not related to fitting.

(15) In the fitting detection device according to (9) to (14), acquiring the second data may include increasing the amplitude of the first data and inputting the first data with the increased amplitude to the learned model.

(16) A fitting detection system according to the present disclosure is a fitting detection system for detecting fitting which includes a vibration sensor configured to detect vibration, a processor, and a storage device configured to store an instruction executable by the processor. The instruction includes acquiring first data indicating information generated from the vibration detected by the vibration sensor, acquiring second data output from a learned model by inputting the first data to the learned model having undergone machine learning using at least information generated from vibration generated by normal fitting as teacher data, determining whether or not the first data is related to fitting based on the second data; and determining whether or not normal fitting is performed based on the first data when the first data is related to fitting.

(17) In the fitting detection system according to (16), the instruction may further include displaying a determination result as to whether or not the fitting is normally performed.

(18) The fitting detection system according to (16) or (17) may further include a server connected via wireless communication. The learned model may be stored in a storage device of the server, and the acquiring the second data may include transmitting the first data to the server via wireless communication, and inputting, by a processor of the server, the first data to the learned model and acquiring the second data output from the learned model.

(19) In the fitting detection system according to (18), the processor of the server may execute at least one of a process of determining whether or not the first data is related to fitting based on the second data and a process of determining whether or not normal fitting is performed based on the first data.

What is claimed is:

1. A fitting detection method for detecting fitting, the method performed by a processor and comprising:

acquiring first data indicating information generated from vibration detected by a vibration sensor;

acquiring second data output from a learned model by inputting the first data to the learned model having undergone machine learning using at least information generated from vibration generated by normal fitting as teacher data;

classifying whether or not the first data is related to fitting based on the second data; and determining whether or not normal fitting is performed based on the first data when the first data is related to fitting.

2. The fitting detection method according to claim 1, wherein when the first data indicates an amplitude waveform of the vibration, and the learned model has undergone machine learning using at least an amplitude waveform of vibration generated by the normal fitting as teacher data, the acquiring the first data includes determining whether or not to execute processing of acquiring the second data based on amplitude of the first data and a first threshold.

3. The fitting detection method according to claim 1, wherein the learned model is an autoencoder, the second data indicates information obtained by compressing and reconstructing the first data using the autoencoder, and the determining whether or not the first data is related to fitting includes comparing the first data with the second data and determining whether or not the first data is related to the fitting based on a result of the comparison.

4. The fitting detection method according to claim 3, wherein the determining whether or not the first data is related to fitting includes calculating a degree of distortion indicating a difference between the first data and the second data and determining whether or not the first data is related to the fitting based on the degree of distortion.

5. The fitting detection method according to claim 1, wherein an amplitude waveform of vibration generated by the normal fitting decreases in amplitude with a lapse of time and has at least two waveform peaks.

6. The fitting detection method according to claim 1, wherein the first data includes an amplitude waveform of vibration due to disturbance other than the normal fitting, and when the first data includes the amplitude waveform of vibration due to the disturbance, it is determined that the first data is not related to fitting.

7. The fitting detection method according to claim 1, wherein the acquiring the second data includes increasing an amplitude of the first data and inputting the first data with the increased amplitude to the learned model.

8. The fitting detection method according to claim 1, further comprising displaying a determination result as to whether or not the normal fitting is performed.

9. A fitting detection device for detecting fitting, comprising:

a processor; and a storage device configured to store an instruction executable by the processor, the instruction including acquiring first data indicating information generated from vibration detected by a vibration sensor, acquiring second data output from a learned model by inputting the first data to the learned model having undergone machine learning using at least information generated from vibration generated by normal fitting as teacher data, classifying whether or not the first data is related to fitting based on the second data; and determining whether or not normal fitting is performed based on the first data when the first data is related to fitting.

10. The fitting detection device according to claim 9, wherein when the first data indicates an amplitude waveform of the vibration, and the learned model has undergone machine learning using at least an amplitude waveform of vibration generated by the normal fitting as teacher data, the acquiring the first data includes determining whether or not to execute processing of acquiring the second data based on amplitude of the first data and a first threshold.

11. The fitting detection device according to claim 9, wherein the learned model is an autoencoder, the second data indicates information obtained by compressing and reconstructing the first data using the autoencoder, and the determining whether or not the first data is related to fitting includes comparing the first data with the second data and determining whether or not the first data is related to the fitting based on a result of the comparison.

12. The fitting detection device according to claim 11, wherein the determining whether or not the first data is related to the fitting includes calculating a degree of distortion indicating a difference between the first data and the second data and determining whether or not the first data is related to the fitting based on the degree of distortion.

13. The fitting detection device according to claim 9, wherein the amplitude waveform of vibration generated by the normal fitting decreases in amplitude with a lapse of time and has at least two waveform peaks.

14. The fitting detection device according to claim 9, wherein the first data includes an amplitude waveform of vibration due to disturbance other than the normal fitting, and when the first data includes the amplitude waveform of vibration due to the disturbance, it is determined that the first data is not related to fitting.

15. The fitting detection device according to claim 9, wherein the acquiring the second data includes increasing the amplitude of the first data and inputting the first data with the increased amplitude to the learned model.

16. A fitting detection system for detecting fitting, comprising:

a vibration sensor configured to detect vibration;

a processor; and a storage device configured to store an instruction executable by the processor, the instruction including acquiring first data indicating information generated from the vibration detected by the vibration sensor, acquiring second data output from a learned model by inputting the first data to the learned model having undergone machine learning using at least information generated from vibration generated by normal fitting as teacher data, classifying whether or not the first data is related to fitting based on the second data; and determining whether or not normal fitting is performed based on the first data when the first data is related to fitting.

17. The fitting detection system according to claim 16, wherein the instruction further includes displaying a determination result as to whether or not the normal fitting is performed.

18. The fitting detection system according to claim 16, further comprising a server connected via wireless communication, wherein the learned model is stored in a storage device of the server, and the acquiring the second data includes transmitting the first data to the server via wireless communication, and inputting, by a processor of the server, the first data to the learned model and acquiring the second data output from the learned model.

19. The fitting detection system according to claim 18, wherein the processor of the server executes at least one of a process of determining whether or not the first data is related to fitting based on the second data and a process of determining whether or not normal fitting is performed based on the first data.

* * * * *